United States Patent
Yoshida

(10) Patent No.: US 8,493,622 B2
(45) Date of Patent: Jul. 23, 2013

(54) PRINTING APPARATUS, METHOD FOR CREATING LOOKUP TABLE, LOOKUP TABLE, PRINTING METHOD, AND PRINTED MATTER

(75) Inventor: Seishin Yoshida, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 712 days.

(21) Appl. No.: 12/685,631

(22) Filed: Jan. 11, 2010

(65) Prior Publication Data

US 2010/0177357 A1    Jul. 15, 2010

(30) Foreign Application Priority Data

Jan. 13, 2009   (JP) ................................ 2009-004897

(51) Int. Cl.
*H04N 1/40* (2006.01)
(52) U.S. Cl.
USPC ......................................... 358/2.1; 358/1.18
(58) Field of Classification Search
USPC ................... 358/1.9, 2.1, 400, 500–502, 468, 358/1.18, 540
See application file for complete search history.

(56) References Cited

U.S. PATENT DOCUMENTS

| | | | |
|---|---|---|---|
| 6,655,798 B2 | 12/2003 | Temple | |
| 7,052,730 B2 * | 5/2006 | Patel et al. | ........................ 427/7 |
| 7,354,072 B2 * | 4/2008 | Yokote et al. | ................... 283/92 |
| 7,682,015 B2 | 3/2010 | Hoshino | |
| 2003/0067527 A1 | 4/2003 | Temple | |

FOREIGN PATENT DOCUMENTS

| | | |
|---|---|---|
| JP | 2002-530229 A | 9/2002 |
| JP | 2002-331708 A | 11/2002 |
| JP | 2004-291268 A | 10/2004 |
| JP | 2004-310355 A | 11/2004 |
| JP | 2005-042199 A | 2/2005 |
| JP | 2005-052984 A | 3/2005 |
| JP | 2005-231350 A | 9/2005 |
| WO | WO 00/30856 A1 | 6/2000 |

* cited by examiner

*Primary Examiner* — Thomas D Lee
*Assistant Examiner* — Stephen M Brinich
(74) *Attorney, Agent, or Firm* — Kilpatrick Townsend & Stockton LLP

(57) ABSTRACT

A printing apparatus for performing printing with the use of a special gloss material and a coloring material is provided. The printing apparatus includes: an inputting unit that receives or acquires image data as an input; and a printing unit that controls the arrangement of the special gloss material and the coloring material on a print target medium on the basis of the inputted image data to print the image data. The printing unit changes the amount of use of the special gloss material depending on an index value that is related to the lightness of a color represented by the coloring material.

7 Claims, 8 Drawing Sheets

PRINTING APPARATUS, METHOD FOR CREATING LOOKUP TABLE, LOOKUP TABLE, PRINTING METHOD, AND PRINTED MATTER

BACKGROUND

1. Technical Field

The present invention relates to a technique for performing printing with the use of a special gloss material and a coloring material.

2. Related Art

A method for performing printing by forming a basecoat layer on a print target medium first and then by printing an image or the like on the basecoat layer is known in the art. An example of such a printing method of the related art is disclosed in, for example, JP-T-2002-530229 and JP-A-2005-52984. The related-art printing method can be applied to various kinds of printing. For example, it can be applied to the reproduction of a metallic color in various color tones. Metallic color reproduction can be performed as follows. For example, a layer of metallic ink is formed on a print target medium first. Then, printing is performed thereon with the use of color ink in such a manner that the color ink is laid over the metallic ink.

Since metallic ink is comparatively expensive, there is a demand for a technique for reducing the amount of use of the metallic ink efficiently. Such a problem to be solved is not unique to metallic ink, which contains a metallic pigment that produces the appearance of metallic gloss. For example, there is a demand for a technique for achieving economical use of various kinds of special gloss ink such as ink that contains a pigment that produces pearly appearance or similar glossy appearance, ink that produces other effects, and the like. In addition, the problem to be solved identified above is not unique to special gloss ink used in an ink-jet printer but is common to various types of printing apparatuses for performing printing with the use of a special gloss material and a coloring material.

SUMMARY

An advantage of some aspects of the invention is to provide a technique for saving a special gloss material efficiently with due consideration given to print quality.

In order to address the above-identified problem without any limitation thereto, the invention provides, as various aspects thereof, a printing apparatus, a method for creating a lookup table, a lookup table, a printing method, a printed matter, a program, a storage medium having the following novel and inventive features.

Application Example 1 (First Aspect): A printing apparatus for performing printing with the use of a special gloss material and a coloring material, including: an inputting section that receives or acquires image data as an input; and a printing section that controls the arrangement of the special gloss material and the coloring material on a print target medium on the basis of the inputted image data to print the image data, wherein the printing section changes the amount of use of the special gloss material depending on an index value that is related to the lightness of a color represented by the coloring material.

The printing apparatus according to the first aspect of the invention changes the amount of use of a special gloss material depending on an index value that is related to the lightness of a color represented by a coloring material. Therefore, it is possible to reduce the amount of use of the special gloss material with due consideration given to a relationship between a color tone in a print area and the index value that is related to the lightness, thereby saving the special gloss material efficiently.

Application Example 2: In the configuration of a printing apparatus according to the first aspect of the invention, it is preferable that the printing section should make the amount of use of the special gloss material relatively small at a highlight area, which is a print area where the index value is lighter than a predetermined value.

The inventors of the subject application discovered the fact that, as an index value that is related to the lightness of a color represented by a coloring material becomes lighter, the index value of a color represented by the coloring material and a special gloss material becomes darker in a highlight area when printing is performed with the overlapping use of a certain amount of special gloss material together with the coloring material. On the basis of the above discovery, a printing apparatus according to the second application example makes the amount of use of the special gloss material relatively small at the highlight area. By this means, it is possible to provide a solution to an imbalance between the color tone and the index value.

Application Example 3: In a printing apparatus having the preferred configuration described above (application example 2), it is further preferable that the printing section should decrease the amount of use of the special gloss material at the highlight area as the lightness of the index value increases. Since a printing apparatus according to the third application example decreases the amount of use of the special gloss material according to the index value, it is possible to achieve a smooth gradational change in lightness at the highlight area. Thus, degradation in print quality does not occur.

Application Example 4: In a printing apparatus having the preferred configuration described above (application example 2 or 3), it is further preferable that the predetermined value should be darker than the index value at a maximum color tone in a print area when printing is performed with the use of the coloring material only; and the maximum color tone should be a color tone at which the index value peaks in a relationship between each color tone and the index value in a print area when printing is performed with the use of the special gloss material and the coloring material.

A printing apparatus according to the fourth application example starts to reduce the amount of use of the special gloss material at a point darker than the index value at a maximum color tone in a print area when printing is performed with the use of the coloring material only, where the maximum color tone is a color tone at which the index value peaks in a relationship between each color tone and the index value in a print area when printing is performed with the use of the special gloss material and the coloring material. Therefore, it is ensured that the index value always becomes lighter as the color tone becomes lighter in the highlight area.

Application Example 5: In the configuration of a printing apparatus according to any of the application examples 1 to 4, it is preferable that the index value should be a luminance level. The index value may be a luminance level. Or, the index value may be brightness (or luminance), ink duty, or the like.

Application Example 6: In a printing apparatus having the preferred configuration described above (application example 5), it is further preferable that the luminance level should be measured with a light-receiving angle of 0° and an illuminating angle of −45°. As conditions for measuring the luminance level, the light-receiving angle may be set at 0°.

The illuminating angle may be set at −45°. Under the colorimetric condition described above, a range for changing the amount of use of the special gloss material can be determined with precision close to visual perception by human eye.

A printing apparatus according to the first application example can be configured, embodied, or implemented as a printing apparatus according to the following seventh application example. Application Example 7 (Second Aspect): A printing apparatus for performing printing with the use of a special gloss material and a coloring material, including: an inputting section that receives or acquires image data as an input; and a printing section that prints the image data, wherein the coloring material includes a cyan coloring material, a magenta coloring material, and a yellow coloring material, a color patch that represents a color line in color tones of a predetermined tone pitch is printed with the use of the coloring material and the special gloss material, at least one end of the color line is white, at least the other end of the color line is black, the color line passes through one of cyan, magenta, and yellow, and a relationship between each step of the color tones and the corresponding amount of use of the special gloss material for a cyan color line that passes through the cyan, a relationship therebetween for a magenta color line that passes through the magenta, and a relationship therebetween for a yellow color line that passes through the yellow are different from one another.

A printing apparatus according to the second application example can be configured, embodied, or implemented as a printing apparatus according to the following eighth application example. Application Example 8 (Third Aspect): A printing apparatus for performing printing with the use of a special gloss material and a coloring material, including: an inputting section that receives or acquires image data as an input; and a printing section that prints the image data, wherein, when a color line that connects white and yellow is printed in color tones of a predetermined tone pitch with the use of the coloring material and the special gloss material, an index value that is related to the lightness of a color becomes darker as the color tone approaches the yellow in a predetermined color tone range from the white to the yellow.

Besides a printing apparatus according to any of the above application examples, the invention can be implemented as a method for creating a lookup table according to any of application examples 9 to 14 described below, a lookup table according to application example 15 described below, a printing method according to application example 16 described below, a printed matter according to application example 17 described below, a computer program, a storage medium that stores the program, and the like.

Application Example 9(Fourth Aspect): A method for creating a lookup table in which a relationship between input values taken into a printing apparatus and values of a special gloss material and a coloring material outputted from the printing apparatus is written, including: preparing an existing lookup table in which a relationship between the input values and output values of the coloring material is written; and creating a new lookup table by adding an output value of the special gloss material to an output value of the coloring material at each of grid points of the existing lookup table, wherein the output value of the special gloss material added is changed depending on an index value that is related to the lightness of a color represented by the output value of the coloring material.

Application Example 10: In the method for creating a lookup table according to the fourth aspect of the invention, it is preferable that the output value of the special gloss material added should be made relatively small at a grid point where the index value is lighter than a predetermined value.

Application Example 11: In the preferred method for creating a lookup table described above (application example 10), it is further preferable that the output value of the special gloss material added should be decreased at a grid point where the index value is lighter than the predetermined value as the lightness of the index value increases.

Application Example 12: It is preferable that the preferred method for creating a lookup table (application example 10 or 11) should further include: measuring the index value for each of predetermined color tones in a print area when printing is performed with the use of the coloring material and the special gloss material; and finding a maximum color tone, which is a color tone at which the measured index value peaks, wherein the predetermined value is darker than the index value at the maximum color tone in a print area when printing is performed with the use of the coloring material only.

APPLICATION EXAMPLE 13: In the method for creating a lookup table according to any of the application examples 9 to 12, it is preferable that the index value should be aluminance level.

Application Example 14: In the preferred method for creating a lookup table described above (application example 13), it is further preferable that the luminance level should be measured with a light-receiving angle of 0° and an illuminating angle of −45°.

Application Example 15: A lookup table in which a relationship between input values taken into a printing apparatus and values of a special gloss material and a coloring material outputted from the printing apparatus is written, wherein the output value of the special gloss material is changed depending on an index value that is related to the lightness of a color represented by the output value of the coloring material.

Application Example 16: A printing method for performing printing with the use of a special gloss material and a coloring material, wherein the amount of use of the special gloss material is changed depending on an index value that is related to the lightness of a color represented by the coloring material.

Application Example 17: A printed matter that is printed with the use of a special gloss material and a coloring material, wherein the amount of use of the special gloss material is changed depending on an index value that is related to the lightness of a color represented by the coloring material in a print area where the special gloss material and the coloring material overlap each other.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. Exemplary Configuration of Printing Apparatus

Figure 1:
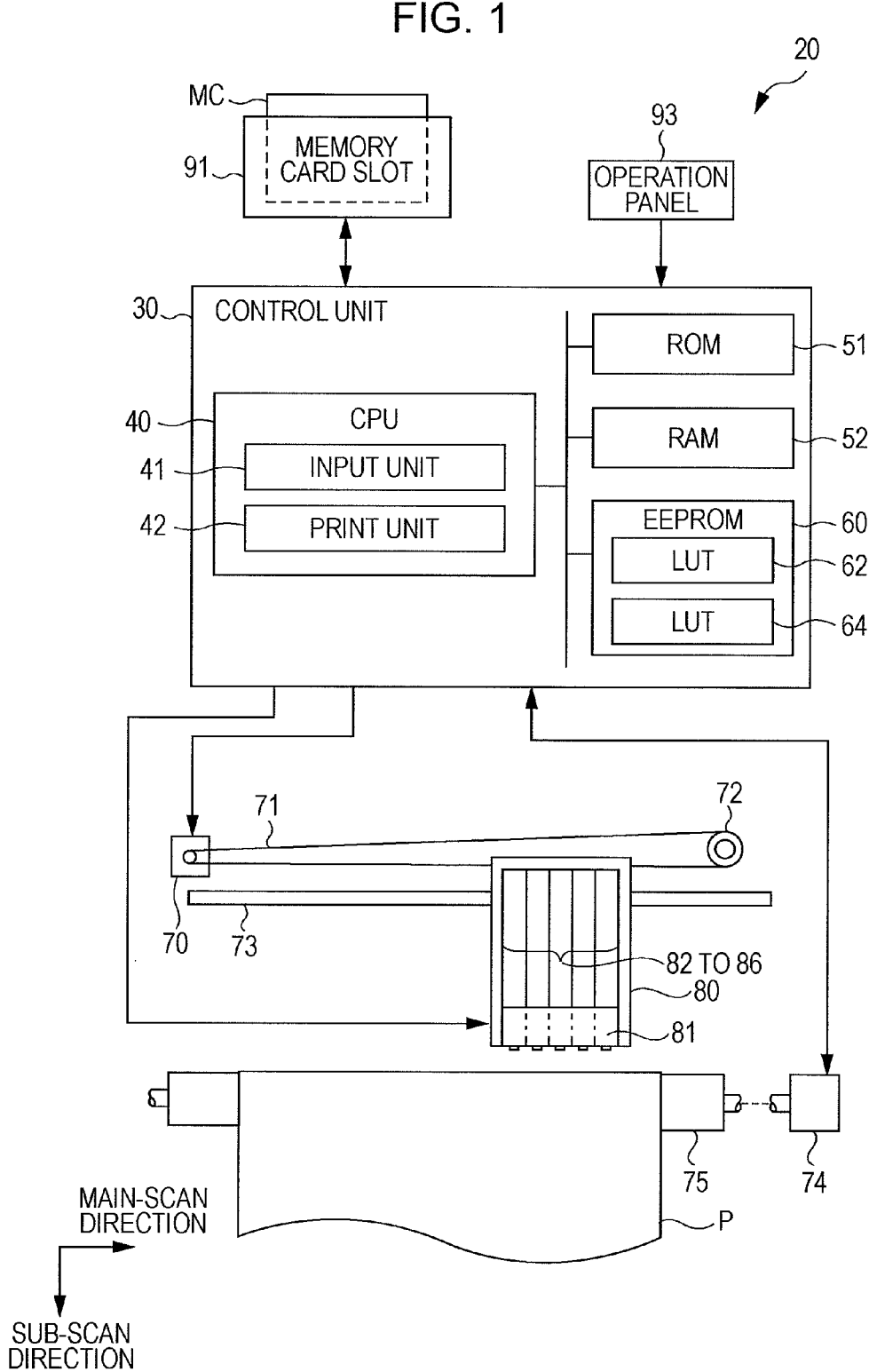
FIG. 1 is a diagram that schematically illustrates an example of the configuration of a printer according to an exemplary embodiment of the invention.

FIG. 1 is a diagram that schematically illustrates an example of the configuration of a printer 20 according to an exemplary embodiment of the invention. As illustrated in FIG. 1, the printer 20 includes a transportation mechanism, a carriage reciprocation mechanism, an ink-discharging mechanism, and a control unit 30. The transportation mechanism transports a print target medium P such as paper through the operation of a paper-feed motor 74. The carriage reciprocation mechanism reciprocates a carriage 80 in the axial direction of a platen 75 through the operation of a carriage motor 70. The ink-discharging mechanism drives a print head 81 that is mounted on the carriage 80 to eject ink from the print head 81 for dot formation. The control unit 30 sends/receives a signal to/from the paper-feed motor 74, the carriage motor 70, the print head 81, and an operation panel 93 for controlling operation.

The mechanism for reciprocating the carriage 80 in the axial direction of the platen 75 includes a sliding movement shaft 73, an endless driving belt 71, a pulley 72, and the like. The sliding movement shaft 73 is provided in parallel with the shaft of the platen 75. The sliding movement shaft 73 supports the carriage 80. The carriage 80 can slide on the sliding movement shaft 73 while being guided by the shaft 73. The endless driving belt 71 is stretched between the carriage motor 70 and the pulley 72.

Color ink cartridges 82 to 85 are detachably attached to the carriage 80. The color ink cartridges 82, 83, 84, and 85 contain cyan ink C, magenta ink M, yellow ink Y, and black ink K, respectively as color ink. In addition, a metallic ink cartridge 86 is detachably attached to the carriage 80. The metallic ink cartridge 86 contains metallic ink S. The print head 81, which is fixed to the bottom of the carriage 80, has a plurality of nozzle lines. The nozzle lines correspond to the color ink of the above colors and to the metallic ink S. These ink cartridges 82 to 86 are attached to the carriage 80 from above the carriage 80. With the attachment of the cartridges, ink can be supplied from each ink cartridge to the print head 81.

In the present embodiment of the invention, the term "color ink" encompasses black ink. In addition, pigment ink is used for color ink described in the present embodiment of the invention.

Metallic ink is ink that gives metallic appearance to a printed matter. An oil-based ink composite that includes a metallic pigment, an organic solvent, and a resin can be used as an example of such metallic ink. In order to produce visually metallic texture effectively, it is preferable that the metallic pigment mentioned above should have a flat particle shape. In addition, a pigment particle should preferably have the following dimension. Let the length of a particle having the shape of a flat plate on a plane be denoted as X. Let the width of the flat particle on the plane be denoted as Y. Let the thickness of the flat particle be denoted as Z. It is preferable that the 50% mean particle diameter R50 of an equivalent circle diameter calculated on the basis of the area size of the flat particle on the X-Y plane should be 0.5 to 3 μm. In addition, it is preferable to satisfy the mathematical condition of $R50/Z>5$. For example, aluminum or aluminum alloy can be used as the material of the metallic pigment. The metallic pigment can be prepared by fragmentizing a metal evaporated film. The density of the metallic pigment contained in metallic ink is, for example, 0.1 to 10.0 weight percent. Needless to say, the composition of metallic ink is not limited to the above example. Metallic ink may have any composition as long as it gives metallic appearance to a target object.

As the composition of the metallic ink S according to the present embodiment of the invention, it is made up of aluminum pigment of 1.5 weight percent, glycerin of 20 weight percent, trienthylene glycol monobutyl ether of 40 weight percent, and BYK-UV3500 (manufactured by BYK Japan KK) of one weight percent.

The control unit 30 includes a CPU 40, a ROM 51, a RAM 52, and an EEPROM 60. The CPU 40, the ROM 51, the RAM 52, and the EEPROM 60 are connected to one another via a bus. The control unit 30 reads out programs stored in the ROM 51 and the EEPROM 60 onto the RAM 52 and then executes the programs. By this means, the control unit 30 functions as an input unit 41 and a print unit 42. The functions of these units will be explained later in detail.

A memory card slot 91 is connected to the control unit 30. A memory card MC is inserted into the memory card slot 91. The control unit 30 reads an image data ORG out of the memory card MC as an input. In the present embodiment of the invention, the image data ORG that is inputted from the memory card MC is RGB data whose color is made up of the three primary color components of red (R), green (G), and blue (B).

A user operates the operation panel 93 to give instructions to the printer 20. Upon receiving the user instructions, the control unit 30 can designate an area including a metallic component (i.e., metallic color) (hereinafter referred to as a "metallic area") in addition to an area including the R, G, and B color components (hereinafter referred to as a "color area") for an arbitrary area in the inputted image data ORG. The metallic area and the color area may overlap each other. The overlapping area is hereinafter referred to as a "metallic color area". The area that is made up of the R, G, and B color components only is hereinafter referred to as a "color-only area". The area that is made up of the metallic component only is hereinafter referred to as a "metallic-only area". That is, the respective areas may be designated in such a manner that dots that are formed with the use of color ink and dots that are formed with the use of metallic ink are mixed in the same area for printing.

A lookup table (hereinafter abbreviated as LUT) 62 and another LUT 64 are stored in the EEPROM 60. A relationship between input values represented in an RGB format and output values represented in a CMYKS format is written in the LUT 62. On the other hand, a relationship between input values represented in the RGB format and output values represented in a CMYK format is written in the LUT 64.

The printer 20, which has the above hardware configuration, drives the carriage motor 70 to reciprocate the print head 81 in the main-scan direction with respect to a print target medium P. In addition, the printer 20 drives the paper-feed motor 74 to move the print target medium P in the sub-scan direction. The control unit 30 drives nozzles at appropriate timing on the basis of print data in synchronization with the reciprocating movement of the carriage 80 (i.e., main-scan movement) and the transportation of the print target medium P (i.e., sub-scan movement). As a result, ink dots having appropriate colors are formed at appropriate dot positions on the print target medium P. In this way, the printer 20 is capable of printing an inputted color image that is read out of the memory card MC on the print target medium P.

B. Print Processing

Figure 2:
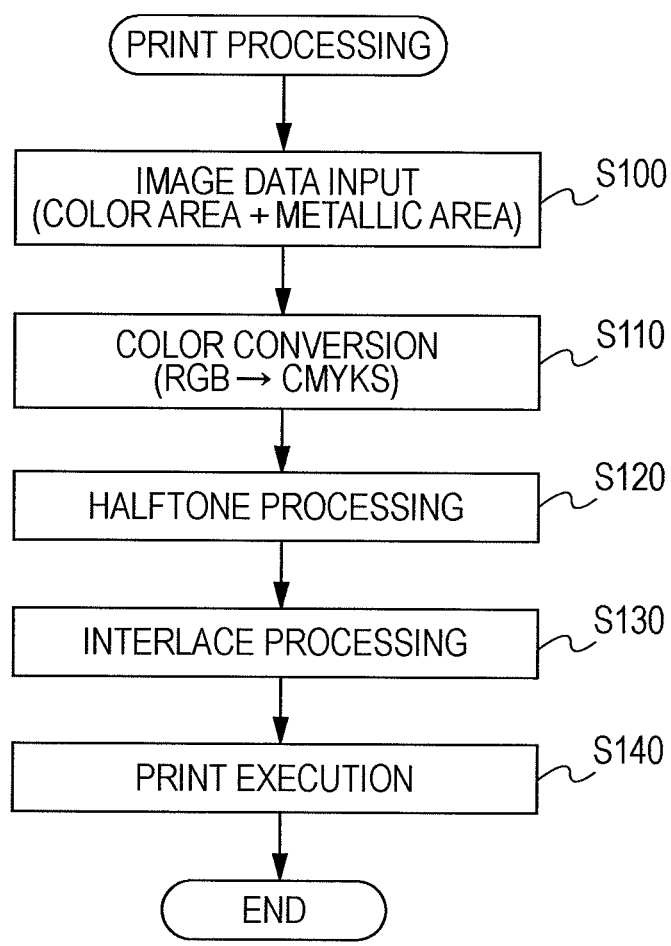
FIG. 2 is a flowchart that schematically illustrates an example of print processing performed by the printer according to an exemplary embodiment of the invention.

Next, print processing performed by the printer 20 is explained below. FIG. 2 is a flowchart that schematically illustrates an example of print processing according to the present embodiment of the invention. The print processing according to the present embodiment of the invention is metallic color print processing. The print processing is initiated when a user operates the operation panel 93, etc., to give instructions for printing a predetermined image stored in the memory card MC. In the present embodiment of the invention, the user designates a metallic area for a print target image in addition to the operation for print instructions. When the print processing is started, as a first step (step S100), the CPU 40 functions as the input unit 41 to read the image data ORG, which is to be printed out, out of the memory card MC through the memory card slot 91. The image data ORG is in the RGB format. Image data that includes the color area and the metallic area is inputted in the step S100.

After the inputting of the image data, the CPU 40 converts the data format of the image data ORG into a data format that can be expressed by the printer 20 on the basis of the LUT 62 and the LUT 64, which are stored in the EEPROM 60 (step S110). Specifically, the data format of the image data ORG is converted into the CMYKS format. In the present embodiment of the invention, the CPU 40 uses the LUT 62 to perform color conversion processing for the metallic area (the metallic color area and the metallic-only area). The CPU 40 uses the LUT 64 to perform color conversion processing for the color-only area. The LUT 62 and the LUT 64 may be stored in other storage medium. For example, the LUT 62 and the LUT 64 may be stored in a hard disk drive. Or, the LUT 62 and the LUT 64 may be downloaded from a computer or the like that is connected to the printer 20.

After the color conversion processing, the CPU 40 performs halftone processing (step S120). In the halftone processing, the color-converted image data is converted into dot ON/OFF data for each color. A well-known ordered dither method is used here. After the halftone processing, the CPU 40 performs interlace processing (step S130). In the interlace processing, the CPU 40 re-arranges the halftone-processed data into dot pattern data for printing at each single execution of main-scan operation in accordance with the nozzle arrangement of the printer 20, paper-feed amount, and the like. After the interlace processing, the CPU 40 drives the carriage motor 70, the paper-feed motor 74, the print head 81, and the like on the basis of the dot pattern data to eject the metallic ink S and color ink from the print head 81, thereby carrying out metallic color printing (step S140). The print processing ends upon the completion of the step S140. The processing in the steps S110, S120, S130, and S140 is carried out as the processing of the print unit 42.

C. Characteristics of LUT 62

Figure 3:
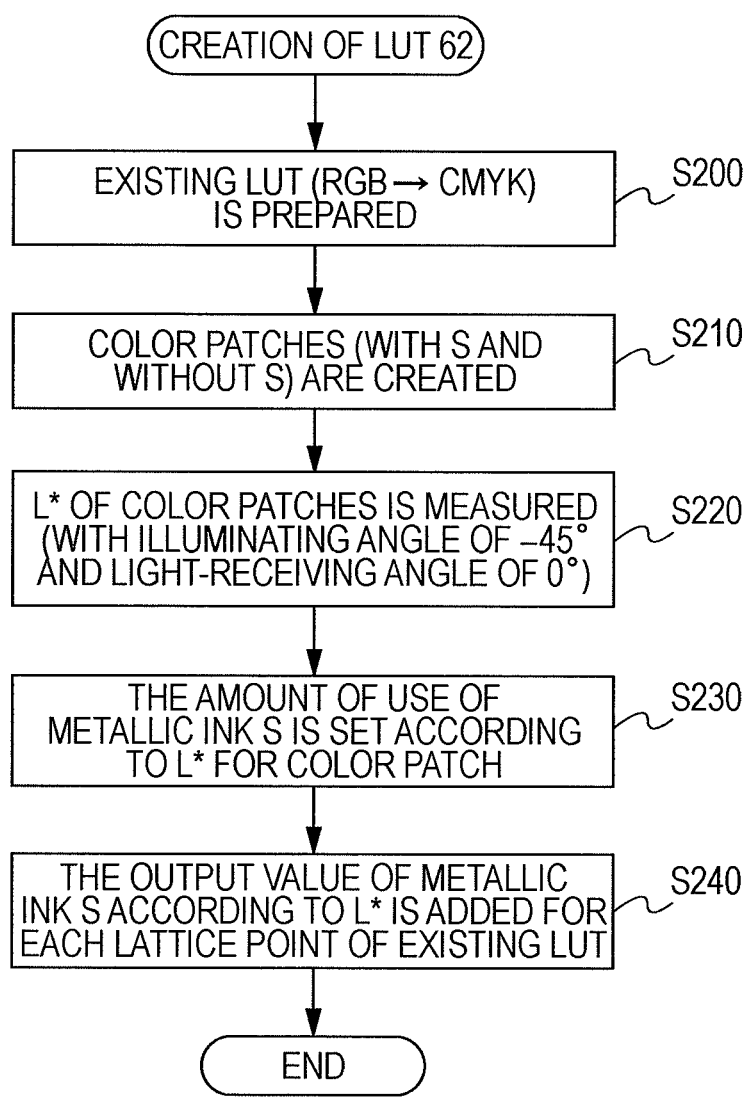
FIG. 3 is a flowchart that schematically illustrates an example of a flow for creating an LUT according to an exemplary embodiment of the invention.

To clarify the characteristics of the LUT 62, a method for creating the LUT 62 used for the above print processing is explained below. An example of a flow for creating the LUT 62 is illustrated in FIG. 3. As illustrated in FIG. 3, the LUT 62 is created through a series of the following procedures. As a first step, an existing LUT in which a relationship between input values represented in the RGB format and output values represented in the CMYK format is written is prepared (step S200). That is, an LUT in which a relationship between input values and color-ink output values only is written (metallic-ink output values are not written) is prepared.

Since the LUT prepared in this step is used for creating the LUT 62, which is used for printing performed with the overlapping use of color ink and the metallic ink S, the ink-duty limit value of the color ink is reduced by a reduction amount equal to the overlapping amount of the metallic ink S to make it lower than that of an ordinary LUT, which is created under the condition that the metallic ink S is not included in output values. The ink-duty limit value of color ink is the upper limit of the sum amount of color ink that can be ejected in a unit area of a print target medium. When an ink-jet printer ejects a large amount of ink in a unit area of a print target medium, the ink runs on the print target medium, which makes it difficult to reproduce colors with good color reproduction performance. For this reason, the color ink-duty limit value is set. The color ink-duty limit value differs depending on printing conditions such as the type of a print target medium, the type of ink, and the like.

After the preparation of the existing LUT, a color patch in which no metallic ink S is used and a color patch in which the metallic ink S is used are created (step S210). The color patch is obtained as a result of performing color conversion processing on image data of predetermined colors that change in graduation with a predetermined pitch with the use of an existing LUT and, then, printing the color-conversion result by the printer 20. The color patch in which no metallic ink S is used means a color patch made up of a color area only. In the description of this specification, this type of a color patch may be hereinafter referred to as a "color-only patch". The color patch in which the metallic ink S is used means a color patch that includes the metallic ink S of a predetermined duty that overlaps the color-only patch. In the description of this specification, this type of a color patch may be hereinafter referred to as an "overlap color patch". In the overlap color patch according to the present embodiment of the invention, the metallic ink S of an ink duty 30% overlaps the color-only patch.

The reason why the ink duty is set at 30% is that, under the printing condition according to the present embodiment of the invention, the greatest visibility of metallic appearance given by the metallic ink S is obtained at this ink-duty percentage. There is no intention to limit the scope of ink-duty value to this exemplary value. The above ink duty of the metallic ink S can be set as a basic setting value for overlapping the metallic ink S.

In the present embodiment of the invention, the printer 20 that has the LUT 62, which is to be created, prints the color patches as explained above. The reason why the color patches are created through printing by the printer 20 is that the performance of the LUT 62, which is created by a method explained below, improves when the color patches are created under the condition that the LUT 62 is used. Notwithstanding the above, however, it is not always necessary to use the printer 20 for creating the color patches.

Figure 4:
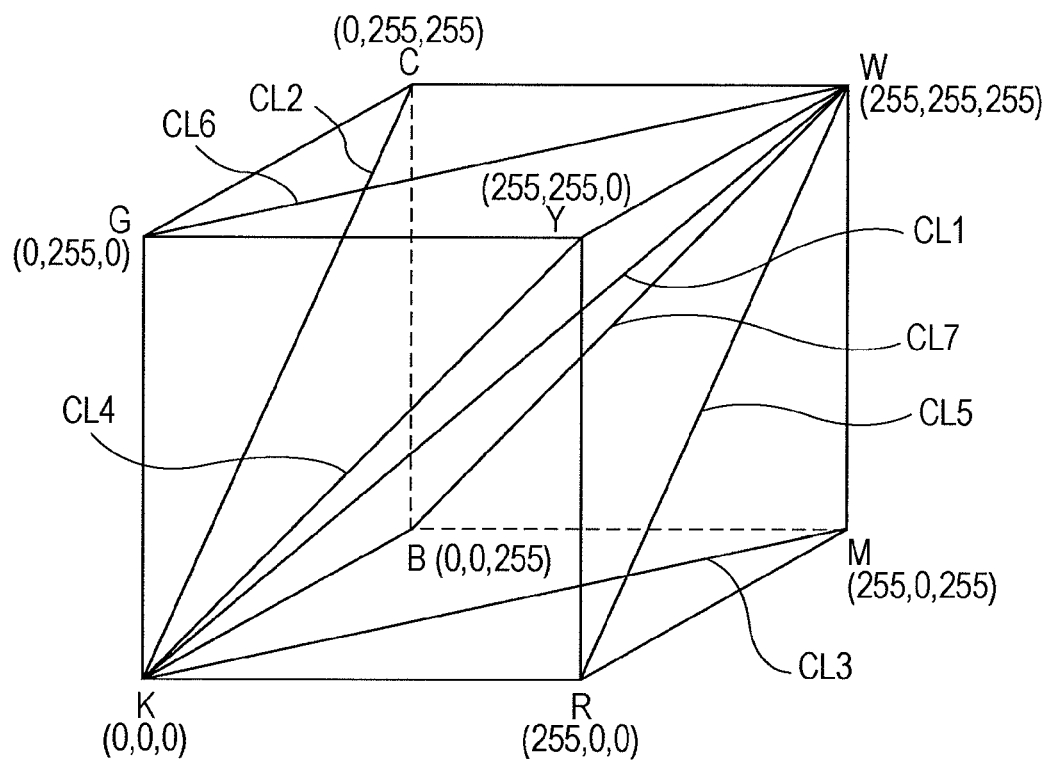
FIG. 4 is a diagram that schematically illustrates an example of an RGB color space representing predetermined colors used for the creation of color patches according to an exemplary embodiment of the invention.

In the present embodiment of the invention, as illustrated in FIG. 4, predetermined colors used for the creation of color patches are the colors of color lines CL1 to CL7 in an RGB color space (with gradation values from zero to 255) for input values of the printer 20. The RGB color space has eight vertices K (0, 0, 0), W (255, 255, 255), R (255, 0, 0), G (0, 255, 0), B (0, 0, 255), C (0, 255, 255), M (255, 0, 255), and Y (255, 255, 0). The color line CL1 is a straight line that connects the vertex K and the vertex W. The color line CL2 linearly connects the vertex K and the vertex W by way of the vertex C.

The color line CL3 linearly connects the vertex K and the vertex W by way of the vertex M. The color line CL4 linearly connects the vertex K and the vertex W by way of the vertex Y. The color line CL5 linearly connects the vertex K and the vertex W by way of the vertex R. The color line CL6 linearly connects the vertex K and the vertex W by way of the vertex G. The color line CL7 linearly connects the vertex K and the vertex W by way of the vertex B. As the color tone change pitch (i.e., gradation change pitch) of the color patches, each of the color lines CL1 to CL7 is divided in 32 steps. In each color line according to the present embodiment of the invention, a color tone value (i.e., gradation value) 1 denotes W (255, 255, 255), whereas a color tone value 32 denotes K (0, 0, 0).

After the creation of the color patches, the luminance level (i.e., luminosity) L* of each color tone is measured with the use of a colorimeter for the color-only patch and the overlap color patch (step S220). In the present embodiment of the invention, the luminance level L* is measured with an illuminating angle of −45° and a light-receiving angle of 0°. The reason why the illuminating angle and the light-receiving angle are set at the above angles respectively is that, under the colorimetric condition explained above, it is found that a measurement result that is not deviated much from a color tone change that is visually perceived by human eye can be obtained. However, the colorimetric condition is not limited to the above example. The condition may be arbitrarily set for measurement.

Figure 5:
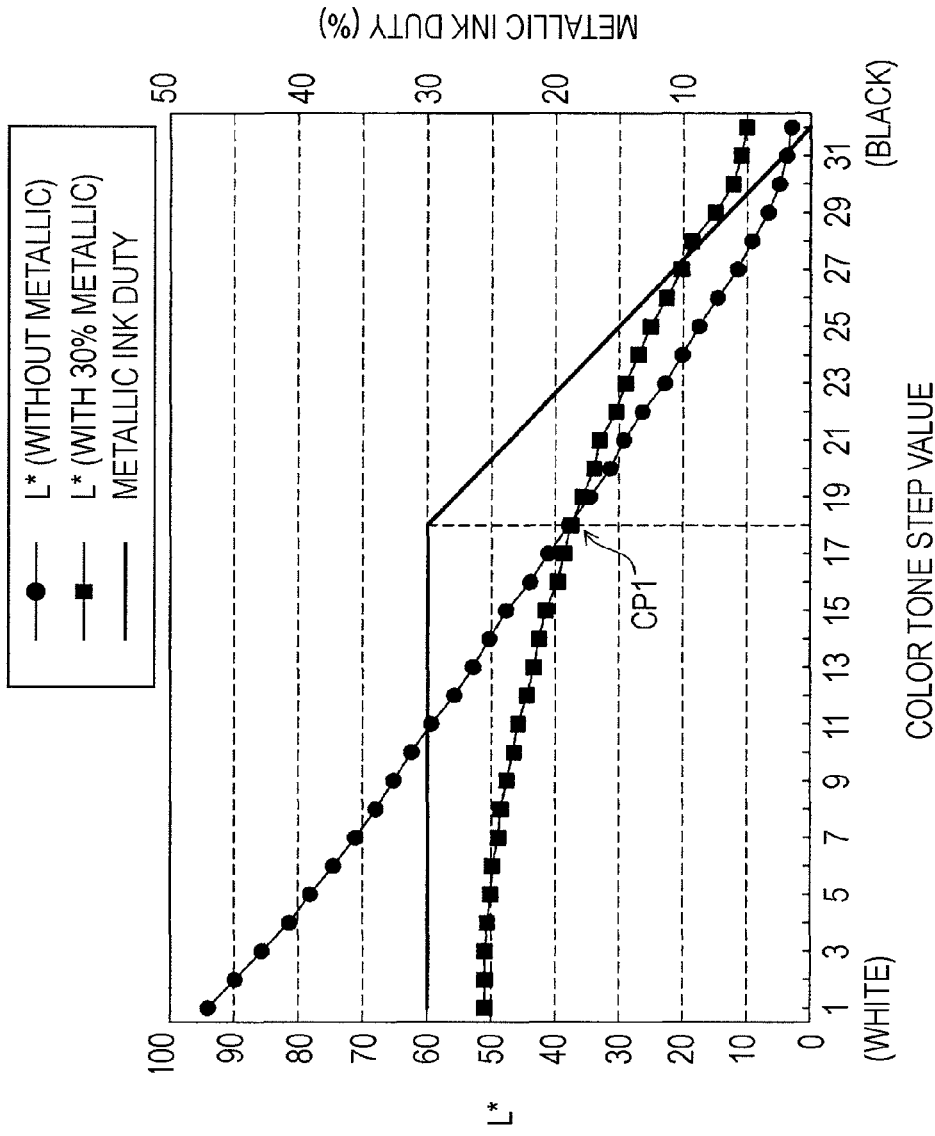
FIG. 5 is a diagram that schematically illustrates an example of a relationship between a color tone, L*, and metallic ink duty for a color line CL1 according to an exemplary embodiment of the invention.

After the measurement of the luminance level L*, the amount of use (i.e., ink duty) of the metallic ink S for each color tone is set according to the measured luminance level L* (step S230). The method for setting the amount of use of the metallic ink S is explained in detail below with reference to FIG. 5. FIG. 5 is a graph that shows a relationship between each color tone and the luminance level L* measured in the step S220 for the color-only patch and the overlap color patch for the color line CL1. The curve corresponding to the color-only patch is shown as "without metallic" in the drawing. The curve corresponding to the overlap color patch is shown as "with 30% metallic" in the drawing. Besides the color tone and the luminance level L*, the ink duty of the metallic ink S that is set on the basis of the relationship between each color tone and the luminance level L* is shown in FIG. 5. As understood from FIG. 5, the plotted line for the color-only patch for the color line CL1 intersects with the plotted line for the overlap color patch for the color line CL1 at a crossover point CP1 (at a color tone step value 18).

In the present embodiment of the invention, the ink duty of the metallic ink S is set at a constant value of 30% for every color tone that is closer to white in comparison with the color tone at the crossover point CP1. In other words, the ink duty of the metallic ink S is set at the fixed value of 30% for every color tone whose luminance level L* is higher in comparison with the luminance level at the crossover point CP1. On the other hand, the ink duty of the metallic ink S decreases as the luminance level L* decreases in a tone range in which the color tone is closer to black in comparison with the color tone at the crossover point CP1, that is, in a tone range in which the luminance level L* is lower in comparison with the luminance level at the crossover point CP1. The ink duty of the metallic ink S reaches 0% when the tone is black.

If a duty reduction start point, which is a point where the reduction of the ink duty of the metallic ink S is started, were set at any color tone at which the luminance level L* is higher than that at the crossover point CP1, the luminance level L* would be high at the duty reduction start point despite the fact that the color tone approaches black (Such a phenomenon is named as a "luminance level inversion phenomenon" in the description of this specification). The long and short of it is that, since the luminance level L* becomes lower as the color tone approaches black for other tones, a smooth gradational change in the luminance level L* would not be realized at the duty reduction start point. In view of the above, it is preferable to set the duty reduction start point at a color tone at which the luminance level L* is not higher than that at the crossover point CP1. For this reason, in the present embodiment of the invention, the duty reduction start point is set at the crossover point CP1.

Figure 6:
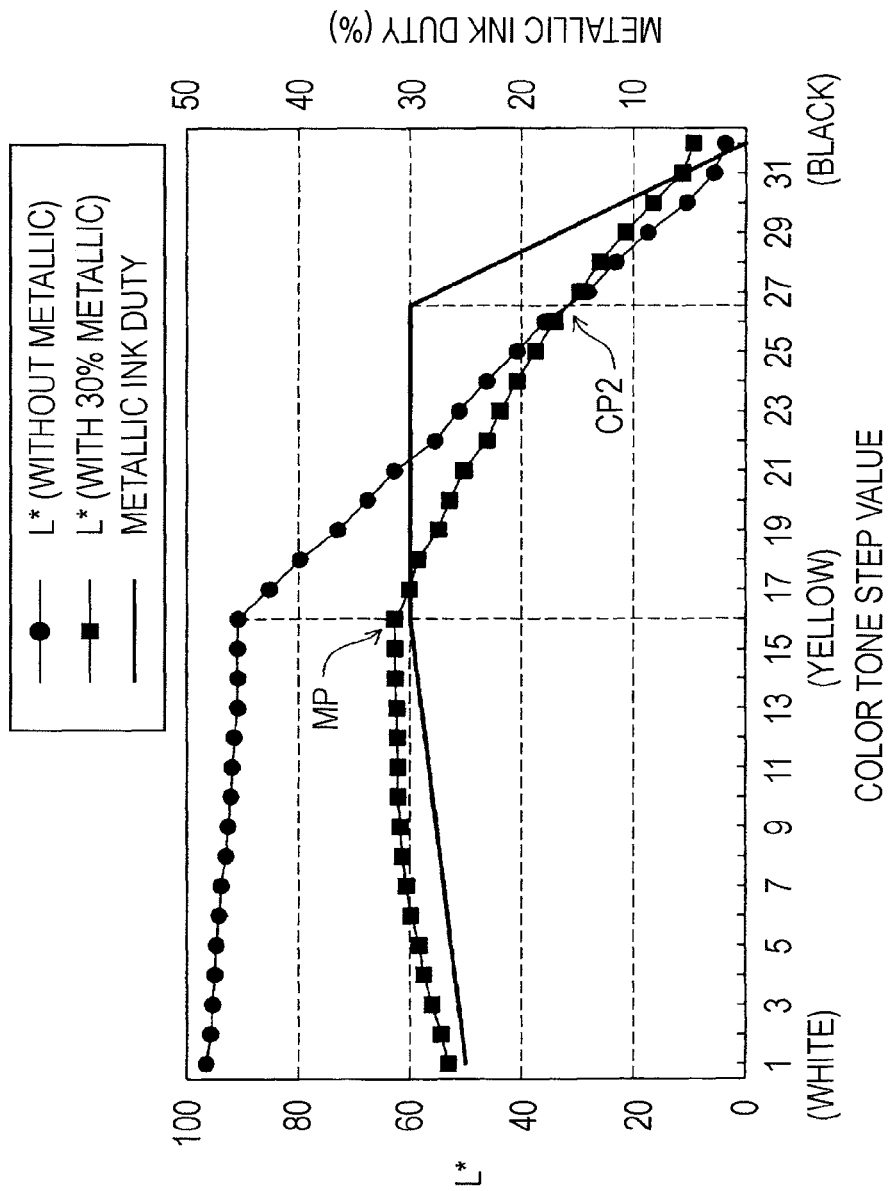
FIG. 6 is a diagram that schematically illustrates an example of a relationship between a color tone, L*, and metallic ink duty for a color line CL4 according to an exemplary embodiment of the invention.

FIG. 6 shows a relationship between each color tone and the luminance level L* for the color line CL4 as shown in FIG. 5 (color line CL1). The relationship between each color tone and the luminance level L* for the color line CL4 has a point of sameness and a point of difference when compared with the relationship between each color tone and the luminance level L* for the color line CL1. As the point of sameness, the plotted line for the color-only patch for the color line CL4 intersects with the plotted line for the overlap color patch for the color line CL4 at a crossover point CP2. Therefore, as explained for the color line CL1 above, the ink duty of the metallic ink S decreases as the luminance level L* decreases in a tone range in which the luminance level L* is lower in comparison with the luminance level at the crossover point CP2 for the color line CL4, too. In addition, the ink duty of the metallic ink S reaches 0% when the tone is black.

As the point of difference, the luminance level L* of the overlap color patch for the color line CL4 peaks at a color tone step value 16 (yellow). A point corresponding to the color tone at which the highest luminance level L* is obtained may be referred to as "the maximum point" MP in the description of this specification. Accordingly, the relationship between the color tone and the luminance level L* for the color line CL4 is different from the relationship between the color tone and the luminance level L* for the color line CL1 in that the luminance level L* decreases as the color tone comes closer to white from (i.e., in comparison with that at) the maximum point MP. The inventors of the subject application discovered the fact that a luminance level inversion phenomenon arises due to the overlapping of the metallic ink S at a highlight area whose luminance level is higher than or equal to a predetermined level. The maximum point MP differs depending on printing conditions such as the property of ink, the type of a print target medium, and the like.

In view of such a phenomenon, in the present embodiment of the invention, the ink duty of the metallic ink S for the color line CL4 is set in such a manner that the duty decreases as the color tone approaches white in a tone range in which the color tone is closer to white in comparison with that at the maximum point MP. In other words, the ink duty of the metallic ink S for the color line CL4 is set in such a manner that the duty decreases as the luminance level L* of the color-only patch becomes higher in a tone range in which the luminance level L* is higher than that at the maximum point MP. The reduction amount of ink duty may be arbitrarily set depending on printing conditions as long as the luminance level inversion phenomenon does not arise. In the present embodiment of the invention, the ink duty at the color tone value 1 (white) is set at 25%.

If the highlight-area-side duty reduction start point, which is a point where the reduction of the ink duty of the metallic ink S at the highlight area side is started, were set at any color tone that is closer to white in comparison with that at the maximum point MP, the luminance level inversion phenomenon would arise at color tones between the highlight-areaside duty reduction start point and the maximum point MP. In view of the above, it is preferable to set the highlight-area-side duty reduction start point either at a color tone that is closer to black in comparison with that at the maximum point MP or at the maximum point MP. In other words, it is preferable to set the highlight-area-side duty reduction start point within a tone range in which, with regard to the color-only patch, the luminance level L* is not higher (i.e., is darker) than that corresponding to the maximum point MP.

Though explanation is omitted, the amount of the metallic ink S is set for each of other color lines in the same manner as done for the color lines CL1 and CL4.

After the setting of the amount of the metallic ink S as explained above, the output value of the metallic ink S is added for each lattice point of the existing LUT on the basis of the amount of the metallic ink S determined in the step S230 (step S240). Specifically, the addition of the output value of the metallic ink S is performed as follows. As a first step, since the color tone values of the horizontal axis shown in each of FIGS. 5 and 6 correspond to the number of steps in the color tone change of color patches, these color tone values are replaced by the color tone values of the existing LUT so as to find a relationship between the color tone values of the existing LUT and the metallic ink S. Then, on the basis of the found relationship, the amount of the metallic ink S that is to be added to the values of the respective lattice points on the color lines CL1 to CL7 is calculated. Then, the amount of the metallic ink S for each lattice point that is not on the color lines CL1 to CL7 is calculated as a result of interpolation arithmetic operation by utilizing the respective lattice points on the color lines CL1 to CL7. Any of various well-known methods that can be used for calculating output values between the lattice points of an LUT can be used for interpolation computation. The amount of the metallic ink S is calculated for every lattice point and then added thereto. As a result, the LUT 62 is created. As a modification example, the amount of the metallic ink S may be set by converting the RGB value of each lattice point of the existing LUT into a L*a*b* value and then determining the amount on the basis of the relationship between the luminance level L* and the ink duty of the metallic ink S shown in FIGS. 5 and 6 in accordance with the L*a*b* value of each lattice point.

In the present embodiment of the invention, the amount of the metallic ink S is determined for the lattice points on the color lines CL1 to CL7 on the basis of the relationship between each color tone and the luminance level L*. However, the number of color lines and color phase (i.e., hue) may be arbitrarily set. For example, needless to say, it is possible to create an LUT with higher precision when the number of color lines is increased.

Figure 7:
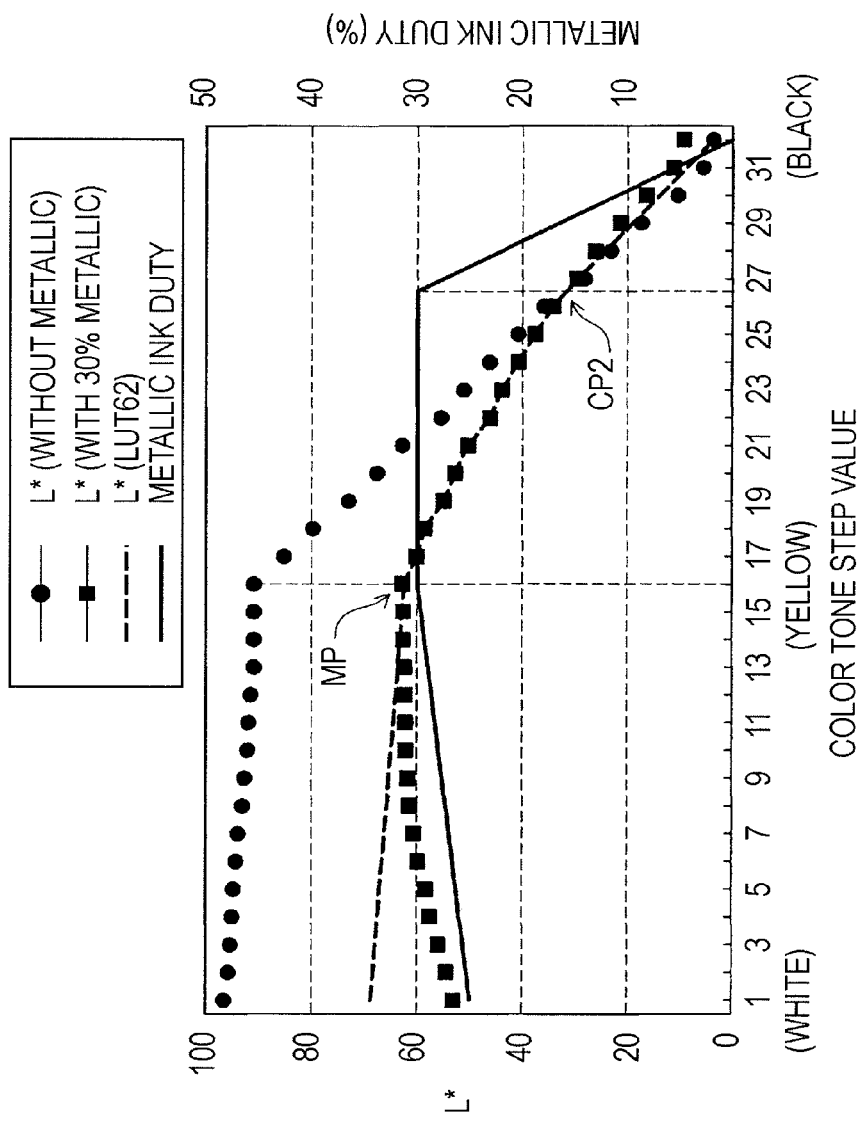
FIG. 7 is a diagram that schematically illustrates an example of the characteristics of the LUT for the color line CL4 according to an exemplary embodiment of the invention.

With reference to FIG. 7, the characteristics of the LUT 62 created with the use of the above method are explained below. FIG. 7 is a diagram that schematically illustrates an example of a relationship between each color tone and the luminance level L* for the color line CL4 when the overlap color patch is printed after color conversion processing performed with the use of the LUT 62. As shown by a dotted line, the line of the overlap color patch printed with the use of the LUT 62 lies (i.e., changes in level) over the line of the overlap color patch (the ink duty of the metallic ink S is set at the fixed value of 30% for every color tone) and under the line of the color-only patch in a tone range from the color tone value 1 (white) to the maximum point MP. The line of the overlap color patch printed with the use of the LUT 62 completely overlaps the line of the overlap color patch (the uniform 30% ink duty of the metallic ink S) in a tone range from the maximum point MP to the crossover point CP2. The line of the overlap color patch printed with the use of the LUT 62 lies over the line of the color-only patch and under the line of the overlap color patch (the uniform 30% ink duty of the metallic ink S) in a tone range from the crossover point CP2 to the color tone value 32 (black). In addition, the luminance level L* of the overlap color patch printed with the use of the LUT 62 always decreases as the color tone approaches from white to black. This means that the luminance level inversion phenomenon does not arise at any color tone in the range from white to black.

The printer 20 having the configuration explained earlier changes the amount of use of the metallic ink S depending on the luminance level L* of a color represented by color ink. Therefore, it is possible to reduce the amount of use of the metallic ink S while maintaining a relationship between each color tone and the luminance level L* in a printing area in good condition, thereby saving the metallic ink S efficiently.

In addition, the printer 20 according to the present embodiment of the invention makes the amount of use of the metallic ink S relatively small at a highlight print area where the luminance level L* is higher (i.e., lighter) than a predetermined value. Therefore, it is possible to prevent the luminance level inversion phenomenon from arising at the print area, thereby providing a solution to an imbalance between the color tone and the luminance level L*. Moreover, the printer 20 makes the amount of use of the metallic ink S relatively small at a dark print area where the luminance level L* is lower (i.e., darker) than a predetermined value. In other words, the amount of use of the metallic ink S is reduced at the print area where metallic appearance given by the metallic ink S is comparatively weak (i.e., small in effects) because of high color ink duty thereat. Therefore, it is possible to achieve economical use of the metallic ink S. If the overlapping ink duty of the metallic ink S were set at a fixed uniform value irrespective of the ink duty of color ink, it would be difficult to ensure that the sum amount does not exceed the ink-duty limit value at a high-color-duty area where the ink duty of color ink is high due to the overlapping amount of the metallic ink S. Accordingly, a color reproduction range would narrow. In this respect, a technique that is described in the present embodiment of the invention provides a solution to such a problem. Thus, degradation in print quality does not occur.

Furthermore, the printer 20 gradually decreases the amount of use of the metallic ink S at a highlight print area as the luminance level L* increases. Therefore, it is possible to achieve a smooth gradational change in the luminance level L* at the highlight print area.

In addition, the printer 20 sets the highlight-area-side duty reduction start point within a tone range in which, with regard to the color-only patch, the luminance level L* is not higher (i.e., is darker) than that corresponding to the maximum point MP. Therefore, the luminance level inversion phenomenon does not arise in the highlight print area.

D. Variation Examples

Variation examples of the foregoing embodiment of the invention are explained below.

D-1. Variation Example 1

In the foregoing embodiment of the invention, it is explained that the amount of use of the metallic ink S is changed depending on the luminance level (L*) of a color represented by color ink. However, an index value that is used for changing the amount of use of the metallic ink S is not limited to the luminance level. Various kinds of an index value that is related to the lightness of a color represented by color ink can be used. For example, brightness (or luminance), ink duty, or the like may be used.

D-2. Variation Example 2

In the foregoing embodiment of the invention, it is explained that the reduction point for the metallic ink S is determined on the basis of the color measurement of color patches. However, the color measurement is not indispensable to the invention. Thus, the color measurement may be omitted. Needless to say, however, it is preferable to conduct a color measurement and then determine the reduction point for the metallic ink S on the basis thereof because the color measurement makes it possible to prevent the luminance level inversion phenomenon from arising with certainty.

D-3. Variation Example 3

Figure 8:
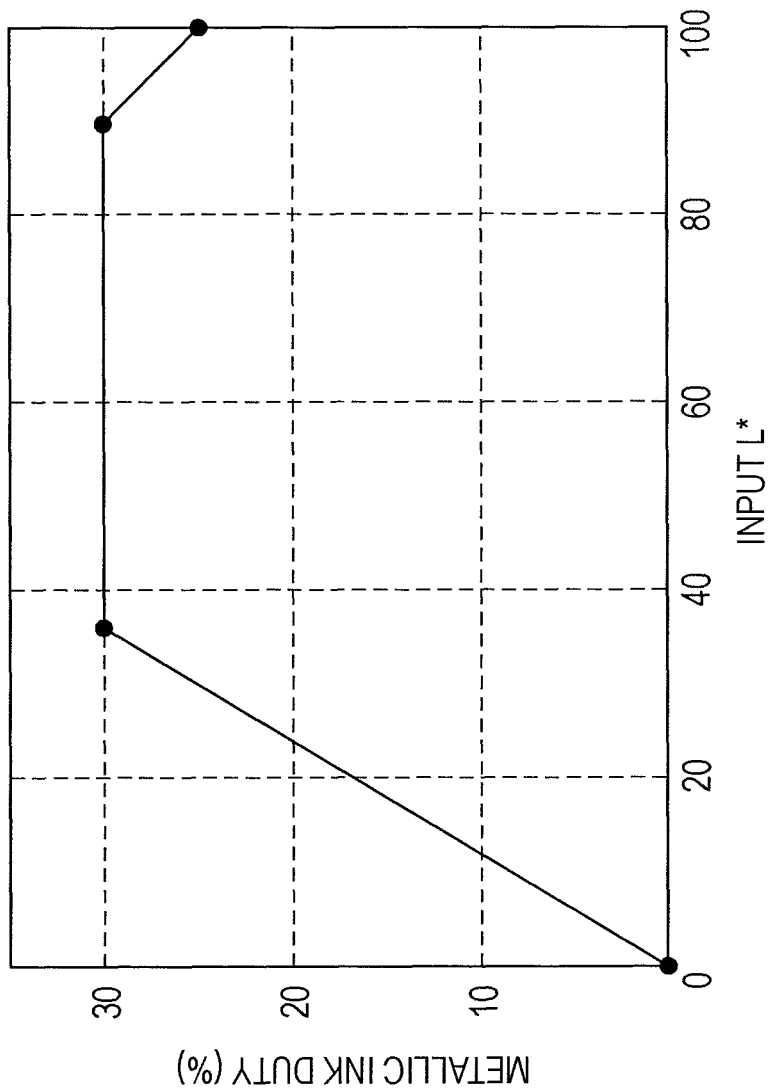
FIG. 8 is a diagram that schematically illustrates an example of a relationship between an input L* and metallic ink duty according to a variation example of the invention.

In the foregoing embodiment of the invention, it is explained that the printer 20 uses the LUT 62 to determine the amount of use of the metallic ink S for print processing. However, it is not always necessary for the printer 20 to use the LUT 62 for determining the amount of use of the metallic ink S. The amount of use of the metallic ink S may be determined on the basis of various kinds of an index value that is related to the lightness of a color represented by input values of color ink. Examples of the various kinds of the index value are: a L* component in a L*a*b* color space, a Y component in a YCbCr color space, a L* component in a L*u*v* color space, a Y component in a XYZ color space, and the like. With such a modification, it is possible to reduce the load of the creation of the LUT. Specifically, for example, the amount of use of the metallic ink S may be determined as follows. A table that contains a relationship between the L* value of input image data and the ink duty of the metallic ink S as shown in FIG. 8 can be pre-stored in the EEPROM 60. In this modified configuration, the CPU 40 calculates the L* value of input RGB data and looks up the table. On the basis of the calculated L* value, the amount of use of the metallic ink S can be determined.

D-4. Variation Example 4

In the foregoing embodiment of the invention, it is explained that the ink duty of the metallic ink S is set at a constant value for a certain range of L*. For example, the ink duty of the metallic ink S is set at a constant value of 30% throughout a range between the maximum point MP and the crossover point CP2 for the color line CL4. However, the scope of the invention is not limited to such an example. For example, a user may be able to select a desired level/degree of metallic appearance that they think necessary for desired print quality. For example, the printer 20 pre-stores a plurality of LUTs (e.g., an LUT whose maximum ink duty value is 30% and an LUT whose maximum ink duty value is 15%). A user can select one LUT that is used for printing. Or, a user may specify a reduction factor. The amount of use of the metallic ink S that is determined on the basis of the LUT 62 is multiplied by the user-specified reduction factor to finally determine the amount of use of the metallic ink S.

D-5. Variation Example 5

In the foregoing embodiment of the invention, the color line CL4 (yellow line), which is a color line whose L* changes at a high level, is taken as an example for explaining the reduction of the use amount of the metallic ink S when L* is higher than a predetermined value. However, the color line to which such a use amount reduction is applied is not limited to the color line CL4. It may be applied to other color lines for which the luminance level inversion phenomenon arises at a highlight area of the overlap color patch. For example, in a case where other color lines such as a light cyan (Lc) color line and a light magenta (Lm) color line are set, it may be applied to these color lines.

D-6. Variation Example 6

In the foregoing embodiment of the invention, metallic color printing that uses metallic ink and color ink is taken as an example. However, the scope of the invention is not limited to metallic color printing. The disclosed concept of the invention can be applied to various kinds of printing that uses color ink and various types of special gloss ink. The term "special gloss ink" means ink that produces the appearance of special gloss (i.e., glossy appearance), a special gloss finish, or the like on the surface of a print target medium that has been subjected to print processing. An example of such special gloss ink is metallic ink explained above, which contains a pigment that gives metallic appearance to a target object. The special gloss ink encompasses ink whose optical characteristics have reflection-angle dependency when it has dried or has been fixed on the surface of a print target medium after print processing. When printed with the use of such ink having reflection-angle-dependent characteristics, a printed matter looks differently depending on a viewing angle. Besides metallic ink, the following ink can be used as the special gloss ink without any limitation thereto: pearl gloss ink that contains a pigment that produces pearly appearance when it has dried or has been fixed on the surface of a print target medium after print processing, lame ink that contains a pigment that has minute convexes/concaves to produce a so-called lame appearance due to irregular and diffused reflection when it has dried or has been fixed on the surface of a printed matter, and mat-finish ink that contains a pigment that has minute convexes/concaves to produce a so-called matte appearance due to irregular and diffused reflection when it has dried or has been fixed on the surface of a printed matter.

D-7. Variation Example 7

In the foregoing embodiment of the invention, it is explained that the printer 20 performs all steps of print processing illustrated in FIG. 2. However, the scope of the invention is not limited to such an example. For example, a computer that is connected to the printer 20 may perform a part of the print processing. In such a modification, a printing system that is made up of the computer and the printer 20 can be regarded as a printing apparatus in a broad sense of the term.

Although an exemplary embodiment of the present invention and some variation examples thereof are described above, needless to say, the invention is not restricted to the exemplary embodiment and the variation examples described herein; the invention can be implemented in a variety of other variations or modifications without departing from the gist, the spirit, and the scope thereof. For example, besides an ink-jet printer, the invention can be applied to various types of a printing apparatus such as a laser printer that utilizes the adhesion of a special gloss toner and color toners to a print target medium to perform printing thereon. Besides a printing apparatus, the invention can be implemented as a method for creating an LUT, an LUT, a printing method, a printed matter, a program, a storage medium, and the like.

The disclosure of Japanese Patent Application No. 2009-004897 filed Jan. 13, 2009 including specification, drawings and claims is incorporated herein by reference in its entirety.

What is claimed is:

1. A printing apparatus for performing printing with the use of a special gloss material and a coloring material, comprising:
   an inputting section that receives or acquires image data as an input; and
   a printing section that controls the arrangement of the special gloss material and the coloring material on a print target medium on the basis of the inputted image data to print the image data,
   wherein the printing section changes the amount of use of the special gloss material depending on an index value that is related to the lightness of a color represented by the coloring material, and
   wherein the printing section makes the amount of use of the special gloss material smaller at a highlight area than at a non-highlight area, wherein the highlight area is a print area where the index value is lighter than a predetermined value.

2. The printing apparatus according to claim 1, wherein the printing section decreases the amount of use of the special gloss material at the highlight area as the lightness of the index value increases.

3. The printing apparatus according to claim 1, wherein the predetermined value is darker than the index value at a maximum color tone in a print area when printing is performed with the use of the coloring material only; and the maximum color tone is a color tone at which the index value peaks in a relationship between each color tone and the index value in a print area when printing is performed with the use of the special gloss material and the coloring material.

4. The printing apparatus according to claim 1, wherein the index value is a luminance level.

5. The printing apparatus according to claim 4, wherein the luminance level is measured with a light-receiving angle of 0° and an illuminating angle of 45°.

6. A printing apparatus for performing printing with the use of a special gloss material and a coloring material, comprising:
   an inputting section that receives or acquires image data as an input; and
   a printing section that prints the image data,
   wherein the coloring material includes a cyan coloring material, a magenta coloring material, and a yellow coloring material,
   a color patch that represents a color line in color tones of a predetermined tone pitch is printed with the use of the coloring material and the special gloss material,
   at least one end of the color line is white,
   at least the other end of the color line is black,
   the color line passes through one of cyan, magenta, and yellow, and
   a relationship between each step of the color tones and the corresponding amount of use of the special gloss material for a cyan color line that passes through the cyan, a relationship therebetween for a magenta color line that passes through the magenta, and a relationship therebetween for a yellow color line that passes through the yellow are different from one another.

7. A printing apparatus for performing printing with the use of a special gloss material and a coloring material, comprising:
   an inputting section that receives or acquires image data as an input; and
   a printing section that prints the image data,
   wherein, when a color line that connects white and yellow is printed in color tones of a predetermined tone pitch with the use of the coloring material and the special gloss material, an index value that is related to the lightness of a color becomes darker as the color tone approaches the yellow in a predetermined color tone range from the white to the yellow, and
   wherein the printing section makes the amount of use of the special gloss material smaller at a highlight area than at a non-highlight area, wherein the highlight area is a print area where the index value is lighter than a predetermined value.

* * * * *